United States Patent
Entenmann

(10) Patent No.: US 10,055,122 B2
(45) Date of Patent: Aug. 21, 2018

(54) METHOD FOR THE DETERMINATION OF A SPEED VECTOR FOR A GESTURE RECOGNITION SYSTEM IN A MOTOR VEHICLE AND DEVICE FOR THE IMPLEMENTATION OF THE METHOD

(71) Applicant: Daimler AG, Stuttgart (DE)

(72) Inventor: Volker Entenmann, Affalterbach (DE)

(73) Assignee: Daimler AG, Stuttgart (DE)

( * ) Notice: Subject to any disclaimer, the term of this patent is extended or adjusted under 35 U.S.C. 154(b) by 225 days.

(21) Appl. No.: 14/910,498

(22) PCT Filed: Jun. 20, 2014

(86) PCT No.: PCT/EP2014/001678
§ 371 (c)(1),
(2) Date: Feb. 5, 2016

(87) PCT Pub. No.: WO2015/018469
PCT Pub. Date: Feb. 12, 2015

(65) Prior Publication Data
US 2016/0188198 A1    Jun. 30, 2016

(30) Foreign Application Priority Data
Aug. 6, 2013   (DE) .................. 10 2013 013 065

(51) Int. Cl.
*G06F 15/00*        (2006.01)
*G06F 13/00*        (2006.01)
(Continued)

(52) U.S. Cl.
CPC .......... *G06F 3/04883* (2013.01); *G06F 3/017* (2013.01); *B60K 2350/1052* (2013.01)

(58) Field of Classification Search
CPC ...................................................... G06F 3/017
(Continued)

(56) References Cited

U.S. PATENT DOCUMENTS 5,986,601 A * 11/1999 Sugimoto ............... G01S 7/415
342/109
6,246,949 B1 * 6/2001 Shirai ................ B60K 31/0008
342/70

(Continued)

FOREIGN PATENT DOCUMENTS

DE   10 2009 030 592 A1   12/2010
EP       1 947 549 A1    7/2008

OTHER PUBLICATIONS

PCT/EP2014/001678, International Search Report (PCT/ISA/220 and PCT/ISA/210) dated Sep. 17, 2014, with partial English translation, enclosing Written Opinion of the International Searching Authority (PCT/ISA/237) (Eleven (11) pages).

*Primary Examiner* — Kevin Nguyen
(74) *Attorney, Agent, or Firm* — Crowell & Moring LLP

(57) ABSTRACT

A method for the determination of a speed vector for a gesture recognition system in a motor vehicle is disclosed. The method includes detection of movement data by a detection unit, and transmission of the movement data to a processing unit in the form of vectors. A totalling of the vectors to form a total vector occurs using the processing unit, until either the total vector reaches a predetermined minimum length or a predetermined number of vectors is totalled. If the predetermined number of vectors is totalled and the predetermined minimum length of the total vector is not reached, a determination of the speed vector as a zero vector occurs. If the predetermined minimum length of the total vector is reached, a determination of the speed vector occurs by averaging the information contained in the total vector. An accurate and dynamic determination of the speed vector is thereby achieved.

10 Claims, 3 Drawing Sheets

(51) Int. Cl.
*G06F 3/0488* (2013.01)
*G06F 3/01* (2006.01)
(58) Field of Classification Search
USPC .......................... 715/700, 763–765; 701/117
See application file for complete search history.

(56) References Cited

U.S. PATENT DOCUMENTS

| | | | |
|---|---|---|---|
| 2008/0166024 A1* | 7/2008 | Iketani | B60R 1/00 382/107 |
| 2010/0198488 A1* | 8/2010 | Groitzsch | G01C 21/26 701/117 |
| 2013/0027300 A1 | 1/2013 | Nakasu et al. | |
| 2014/0067206 A1* | 3/2014 | Pflug | B60W 10/04 701/41 |
| 2015/0063648 A1* | 3/2015 | Minemura | G06K 9/00798 382/104 |

* cited by examiner

METHOD FOR THE DETERMINATION OF A SPEED VECTOR FOR A GESTURE RECOGNITION SYSTEM IN A MOTOR VEHICLE AND DEVICE FOR THE IMPLEMENTATION OF THE METHOD

BACKGROUND AND SUMMARY OF THE INVENTION

In modern motor vehicles, systems which are controlled with gestures are increasingly used to control additional functions of the motor vehicle. Correspondingly, in modern motor vehicles, a plurality of different gesture recognition systems are applied. These are both contactless systems which recognize a gesture, for example via a camera, as well as systems which must be touched by a user in order to be able to recognize a gesture, such as, for example, touch-sensitive screens or optical finger navigation modules (also referred to as "OFN"). For all gesture recognition systems in a motor vehicle, it applies that a speed, above all, however, a direction of a gesture, is to be determined as precisely as possible. The current speed and direction of a gesture can be depicted by a speed vector. The direction thereof then represents the direction of the detected gesture and its length represents the speed of the gesture.

The object of the present invention is to create a method and a device to determine a speed vector for a gesture recognition system in a motor vehicle, by means of which the speed vector is able to be determined with a high level of accuracy and at the same time with high dynamics.

This object is solved according to the invention by a method or a device according to the independent claims.

Advantageous embodiments of the invention are subject matter of the dependent claims.

In order to achieve a particularly accurate and at the same time dynamic determination of a speed vector, two steps are initially provided to determine a speed vector for a sensory recognition system or gesture recognition system in a motor vehicle: a detection of movement data by a detection unit and a transmission of movement data to a processing unit in the form of vectors. A totalling of the vectors to form a total vector then occurs using the processing unit. This occurs until either the total vector reaches a predetermined minimum length or a predetermined number of vectors is added up. If the predetermined number of vectors is added up, and the predetermined length of the total vector is not reached, the speed vector is determined to be a zero vector. If the predetermined length of the total vector is reached, independently of the number of vectors added up, the speed vector is determined by an averaging of the information contained in the total vector. The averaging occurs here over the number of vectors totalled in the total vector. It is therefore virtually a type of standardization.

In other words, information concerning the detected movement data is therefore collected in the total vector and this collected information is evaluated as soon as it exceeds a determined quantity. If at this point in time, the content of the collected information is not sufficient for a reliable determination of the speed vector, this is determined to be zero. If the content of the information, however, is sufficient for a reliable determination of the speed vector, this determination is carried out by averaging. This has the advantage that, in the case of a slow speed of the gesture represented by the movement data, an accurate determination of the speed vector can occur by slow averaging. At the same time, in the case of a quick speed of the gesture represented by the movement data, an individual value consideration is effectively carried out and high dynamics are therefore achieved. Therefore, both slow and high speeds can each be determined with optimum accuracy and dynamics.

Advantageously, the totalling of the vectors to form a total vector by the processing unit occurs until either the total vector reaches a predetermined minimum length or a predetermined number of vectors is totalled, or the totalling is carried out within a predetermined time. This means the totalling is ended and the speed vector is determined as soon as a predetermined time has elapsed since the determination of the last speed vector. This has the advantage that the method also functions reliably with detection units which do not transmit movement data to the processing unit under certain circumstances. Then, for example, an infinitely long wait is prevented if the detection unit should malfunction or simply detect no movement data.

Furthermore, the speed vector is advantageously determined from the total vector as soon as two consecutive vectors to be totalled have a length of zero. This has the advantage that a continuation of the total vector in the case of a sudden stop of the gesture represented by the movement data, or, in the case of a touch-sensitive detection unit, also in the case of an interruption of the touching, is prevented. The speed vector is therefore also set to zero as soon as the speed of the gesture represented by the movement data decreases to zero.

In particular it is provided here that the speed vector is determined from the total vector, as soon as no vector is transmitted to the processing unit for a predetermined time. This has the previously referred to advantage in particular in the case in which the detection unit does not transmit any movement data as long as it does not detect any.

Advantageously, the speed vector is determined from the total vector as soon as the length of two consecutive vectors to be totalled differs by more than the minimum length. This has the advantage that large changes of speed can be recognized quickly and if necessary a checking of the length of the total vector can be omitted, which leads to quicker processing. In particular, abrupt changes of direction can therefore be quickly and precisely recognized.

It can furthermore be provided that the movement data are detected by a touch-sensitive detection unit. This has the advantage that an efficient determining of the speed vector is possible, as fundamentally only movement data are detected in a motor vehicle having several passengers if, in fact, a touching is also present, so a gesture is intended and therefore a gesture recognition is desired.

It is particularly advantageous that the movement data are detected by an optical finger navigation module. Such modules are suitable in a particular manner for an application of the vehicle, as only movement increments are detected here, such that a high level of accuracy in combination with high dynamics is particularly desirable in this case. In particular, such modules are particularly small, able to be applied in a versatile manner, and save energy such that they are provided for use in a motor vehicle.

Preferably it is provided that the movement data are transmitted at discrete, predetermined time intervals. This has the advantage that a further processing is very simple and the method can therefore be implemented technically in a particularly cost-effective manner.

Advantageously it is furthermore provided that the movement data are transmitted at variable time intervals. This has the advantage that communication bandwidths can be saved as no zero information can be transmitted and furthermore can be processed with detection units which only transmit movement data if they also detect movement data.

The invention also relates to a device to determine a speed vector for a gesture recognition system in a motor vehicle, wherein the device has equipment which is suitable to implement the previous method or its advantageous embodiments.

The preferred embodiments presented with regard to the method according to the invention and the advantages thereof apply accordingly for the device according to the invention.

Further features of the invention arise from the claims, the figures and the description of the figures. All features and feature combinations referred to above in the description as well as the features and feature combinations referred to in the description of the figures and/or in the figures alone are not only able to be applied in the respectively specified combination, but also in other combinations or alone.

The present invention is explained below by means of embodiments with reference to the enclosed drawings.

DETAILED DESCRIPTION OF THE DRAWINGS

Figure 1:
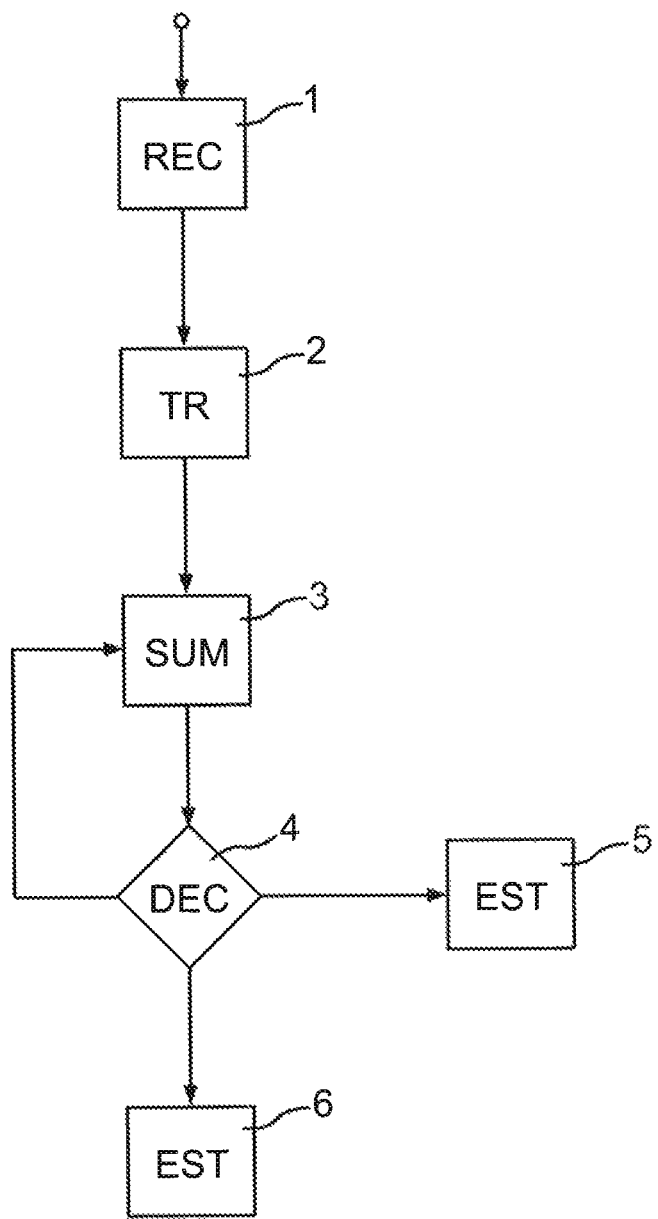
FIG. 1 is a flow diagram of the method according to the invention.

In the figures, identical or functionally identical elements are provided with the same reference numerals.

In FIG. 1, a flow diagram of the method according to the invention is shown. In a first step, a detection 1 of movement data takes place here, the movement data representing a gesture of a user. This detection 1 can, for example, occur using a camera, but can also occur using a touch-sensitive display element or, particularly advantageously, using an optical finger navigation module.

The detected data are then made available to this in a second step by a transmission 2 to a processing unit in the form of vectors. This transmission 2 can, for example, occur at regular, set time intervals, for example every 40 ms, wherein then, should no movement data be detected at such a time interval, a transmission 2 nevertheless occurs and, for example, a zero vector is transmitted. Alternatively, the transmission 2 can also then only occur if movement data is in fact detected.

In a third step, a totalling 3 then takes place, where the transmitted vectors are added up to form a total vector.

Now, for example, a checking 4 can occur in a further step, wherein it is determined whether the length of the total vector exceeds a predetermined value of a predetermined minimum length LM (FIG. 3, 4), for example corresponding to a movement of 0.75 mm, or whether a certain maximum number NM (FIG. 4) of vectors, for example 20, was added up to form the total vector, and for example also whether the totalling 3 has already lasted for a specific, predetermined time. Should none of the two or three conditions be met, then the totalling 3 is continued. Otherwise the totalling 3 is ended and the current speed vector is determined.

Should the total vector still be shorter than the predetermined minimum length LM (FIG. 3, 4), then no sufficient movement data is present for a reliable determination of the speed vector, and a determination 5 of the current movement vector to be a zero vector follows. It can therefore be assumed that no movement has occurred.

Should the total vector at least reach the predetermined minimum length LM (FIG. 3, 4), then a determination 6 of the current movement vector from the information contained in the total vector follows. This occurs via a form of averaging, i.e., for example the total vector is divided in its length LS (FIG. 2) by the number of vectors contributing to it, which were added up. Using this combination of different abortion conditions for the totalling 3, a slow averaging can be carried out automatically in the case of a slow movement, and a speed vector determination can be carried out by a determination of individual values in the case of a quick movement. Therefore the best possible accuracy and dynamics for the determination 5, 6 of the speed vector is achieved in both cases, wherein accuracy and dynamics of one of the maximum vectors to be totalled are set by the selection of the minimum length LM (FIG. 3, 4) and the maximum number NM (FIG. 4).

Figure 2:
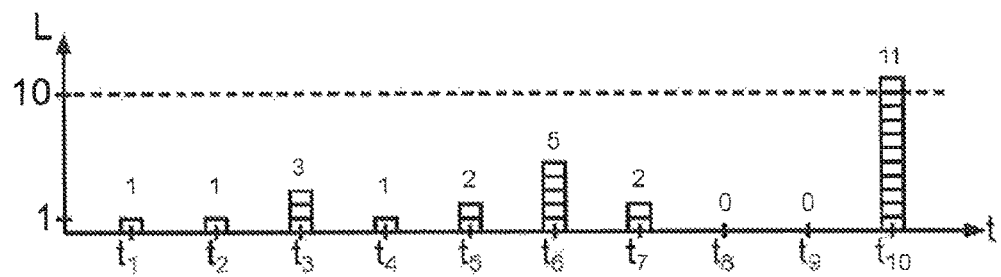
FIG. 2 is an exemplary depiction of lengths of vectors, which are transmitted from a detection unit to a processing unit, over time.

In FIG. 2, an exemplary depiction of lengths L of vectors which are transmitted from a detection unit to a processing unit is depicted, wherein the lengths L are shown over time t in discrete time steps t1 to t10. The transmission 2 (FIG. 1) therefore occurs here at discrete time steps t1 to t10. The lengths L of the vectors are specified as numbers via the graphic depictions for orientation. The lengths L are applied in the present case for a slow movement which is quicker in the last time step t10. A movement having a speed of 1 mm/s, for example, can be referred to as slow. At points in time t1 to t10, individual vectors are each transferred to the processing unit. The vectors initially have, in the present example, very short lengths L, in particular values between 1 and 5 at the times t1 to t9. At the point in time t10, the movement becomes quicker, such that the length L of the transferred vector is greater, as can be seen. The units for the lengths L are selected arbitrarily in the present case; they can therefore refer to any values which, for example, lie in the range from 1 to 1000, so typically span several, for example three, orders of magnitude. Maximum detected speeds therefore consequently lie, in the shown example, at 1000 mm/s, for example.

Figure 3:
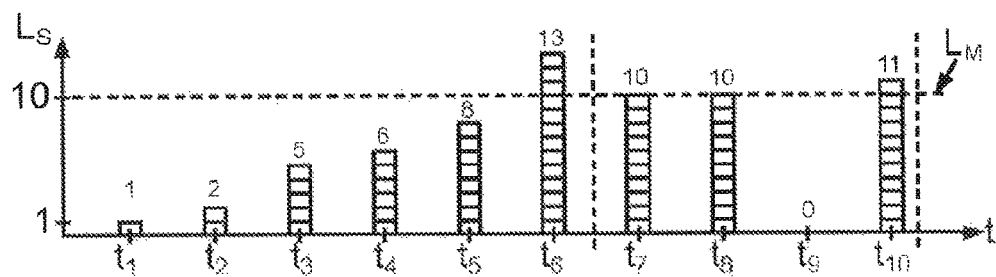
FIG. 3 is an exemplary depiction of a length of a total vector over time according to one embodiment, corresponding to the lengths of vectors depicted in FIG. 2.
Figure 4:
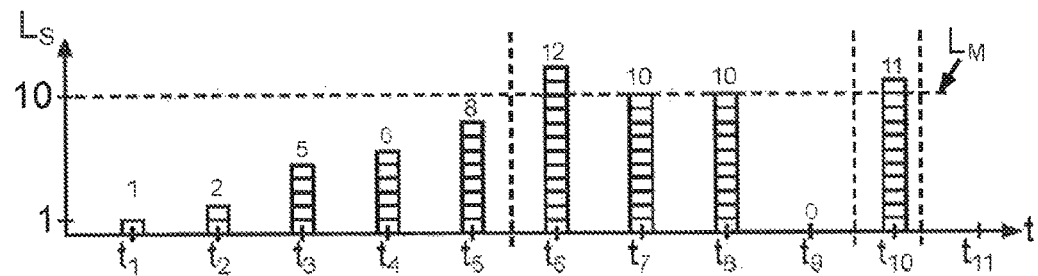
FIG. 4 is an exemplary depiction of a length of a total vector over time according to a further embodiment corresponding to the lengths of vectors depicted in FIG. 2.

FIG. 3 shows an exemplary depiction of a length of a total vector over time according to one embodiment corresponding to the lengths of vectors depicted in FIG. 2.

More exactly, according to FIG. 3, the length of the total vector is re-initialized at a respective point in time with a current vector, and then is calculated by a backward addition until reaching an abortion criterion. According to the embodiment in FIG. 3, the abortion criterion is present if a length LS of the total vector reaches or exceeds a predetermined minimum length LM and/or if the total vector is the equal to a zero vector at two consecutive points in time, i.e., the length LS of the total vector is zero.

In FIG. 3, an exemplary depiction of a length LS of a total vector is shown over time t in discrete time steps t1 to t10. The length LS of the total vector at the corresponding point in time is specified as a number via the graphic depiction. It is good to recognize how the length LS of the total vector continuously increases over the time steps t1 to t6, as the length LS of the total vector is the sum of the lengths L of the transmitted vectors, which are depicted in FIG. 2. At the point in time t6, the length LS of the total vector exceeds the minimum length LM which is set at 10 in the present example.

This has the consequence that the speed vector is determined with the total vector of the point in time t6. In the present example, the length LS of the total vector, which amounts to 13 at the point in time t6, would therefore be divided by the number of contributing individual vectors, which amounts to 6 in the present example, such that the determined speed here amounts to 2⅙.

The vectors t7 (=2), t6 (=5), t5 (=2) and t4 (=1) are added up for the point in time t7. The total of t7 to t4 results in 10, whereby the minimum length is reached. The determined speed lies at 10:4=2.5.

The vectors t8 (=0), t7 (=2), t6 (=5), t5 (=2) and t4 (=1) are added up for the point in time t8. The total of t8 to t4 results in 10, whereby the minimum length is reached. The determined speed lies at 10:5=2.

Only vector t9 (=0) is considered for the point in time t9. Then the totalling is aborted, as the second zero vector follows directly after t8 (=0). The speed vector is determined as a zero vector. A long continuation of the total vector during stopping is therefore prevented.

The vector t10 (=11) is considered for the point in time t10. As this vector already lies above the minimum length, the totalling is aborted. The determined speed is 11:1=11. The quick movement is reacted to without delay.

FIG. 4 shows an exemplary depiction of a length of a total vector over time according to a further embodiment corresponding to the lengths of vectors depicted in FIG. 2.

More exactly, according to FIG. 4, the length of the total vector is re-initialized at a respective point in time with a current vector, and then is calculated by a backward addition until reaching an abortion criterion. According to the further embodiment in FIG. 4, the abortion criterion is present if a length LS of the total vector reaches or exceeds a predetermined minimum length LM and/or if the total vector is equal to a zero vector at two consecutive points in time, i.e., the length LS of the total vector is zero and/or the maximum number of vectors contributing to the total vector is totalled, i.e., a predetermined number of vectors is totalled. If the maximum number is reached without the predetermined minimum length LM being reached or exceeded, the speed vector is determined as a zero vector.

In FIG. 4, the maximum number NM of vectors entering as a maximum into the total vector is set to 5, in addition to the minimum length of LM of 10 in FIG. 3.

The vectors at points in time t1 to t5 are totalled analogously to FIG. 3 for the respective points in time t1 to t5. As the maximum number NM of vectors of 5 is reached at the point in time t5, the totalling of the vectors is aborted and the resulting speed vector is determined to be zero, as the total vector at the point in time t5 is below the minimum length LM of 10.

The vectors t6 to t2 are added up for the point in time t6. The total vector is 12 and therefore is larger than the minimum length LM of 10. The determined speed lies at 12:5=2.4.

The vectors t7 to t4 are added up for the point in time t7. Then the minimum length of 10 is reached. The determined speed lies at 10:4=2.5.

The vectors t8 to t4 are added up for the point in time t8. In turn, the minimum length of 10 is reached. The determined speed lies at 10:5=2

Only the vector t9 is added up for the point in time t9, as the second zero vector follows after t8. The determined speed is therefore zero.

Only the vector t10 is considered for the point in time t10, which already exceeds the minimum length. The determined speed is 11:1=11.

This has the consequence that, after the point in time t5, independently of whether the total vector reaches the minimum length LM or not, a determination 5, 6 of the speed vector occurs. For example, however, a temporal limit can also be set such that, for example, a determination 5, 6 of the speed vector occurs at the latest every 200 ms. As before, however, in this example, in the case of the total vector reaching the minimum length LM independently of time passed or the number N of the vectors currently totalled to form the total vector, the speed vector is determined. In the present case, as the length LS of the total vector at the point in time t5 lies at 8 below the minimum length LM of 10 which applies in the present case, the speed vector is determined to be a zero vector. As in the present example the current speed vector is also determined as soon as two transmitted vectors consecutively have a length L equal to zero, the current speed vector is determined again after the point in time t9, which in the present example results in a current speed vector of zero, as the length LS of the total vector at the point in time t9 does not reach the minimum length LM of 10. At the point in time t10, a vector exceeding the minimum length LM is transmitted which therefore represents a quicker movement, for which reason the current speed is determined at or directly after the point in time t10. This then results to be 11 in the shown example. It is therefore clear that the method is very flexible, and is applicable both to slow and to quick movements.

Figure 5:
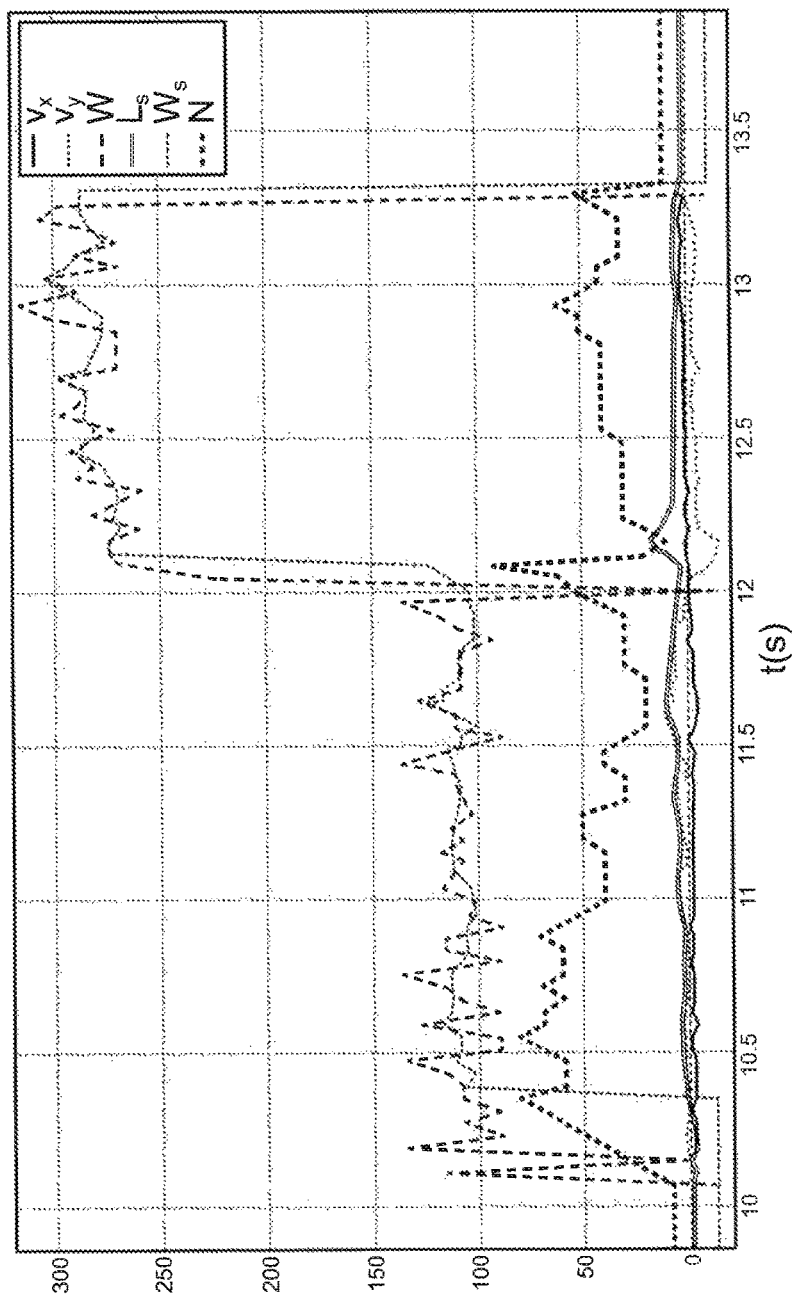
FIG. 5 is a depiction of variables relevant for the method over time for a slow swiping movement.
Figure 5:
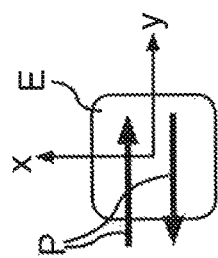

In FIG. 5, a depiction of variables relevant for the method in arbitrary units is shown as a graph over time in seconds. Below the graph, a schematic depiction of the gesture on which the shown variables are based is additionally shown as an arrow P in an x-y plane in front of a symbolic piece of detection equipment E.

In the present example, the gesture is a slow swiping movement from left to right and then back again without a pause. A movement therefore only occurs in the y direction. This can also be well recognized from the movement data shown in the graphs, in particular the speed $v_x$ in the x direction and the speed $v_y$ in the y direction. The speed $v_x$ in the x direction is in particular continuously approaching zero, whereas the speed $v_y$ in the y direction is slightly positive, initially between t≈10.1 s and t=12 s, so describes a slow gesture directed to the right, and then is slightly negative between t=12 s and t≈13.3 s, so describes a slow gesture directed to the left. Obviously, a change of direction of the swiping movement therefore takes place at the point in time t=12 s.

After the movement data has been transmitted as vectors, a piece of information concerning a direction W of the gesture represented by the movement data is also present in the processing unit with the information concerning the speeds $v_x$, $v_y$. The exact determination of the direction is actually particularly important for an interpretation of a gesture, often more important than the exact determination of the speed of a gesture. The direction information contained in the transmitted vectors is shown as a direction W in the graphs. The direction W can here occupy values between −30° and 330°. It can be recognized that the direction W firstly occupies a value of approx. 110° between t≈10.1 s and t=12 s, and then increases to approx. 290° between t=12 s and t≈13.3 s. This change of direction W by approx. 180° corresponds to the change of direction of the swiping movement. An important thing to recognize here is that the value W fluctuates greatly, so the direction W is difficult to evaluate in the sense of a gesture recognition. This is generally often the case for slow gestures.

The advantages of the method are clear if the variables relating to the total vector are considered. These are the length LS of the total vector, the direction WS of the total vector as well as the number N of the vectors currently added up in the total vector. The length LS of the total vector shows, in the present example, the absolute value of the speed. In particular, the direction WS of the total vector in comparison to the direction W must be considered. The direction WS in particular arises by averaging from the direction W, is therefore smoothed and can be expected to be substantially easier in the sense of a gesture recognition.

The functionality of the method can be understood well in the course of the number N of the vectors added up in the total vector. From t≈10.1 s, the number N increases greatly, as now mainly only movement data are detected and vectors are transmitted and added to the total vector. As soon as the speed vector is determined from the total vector for the first time, the number N of the added up vectors levels off. With the slight increase of the speed $v_y$, the length L of the added up vectors also increases, for which reason fewer of these vectors must be added up for an accurate determination 6 (FIG. 1) of the speed vector. The number N also decreases as shown. During the change of direction at t=12 s, the speed $v_y$ in the y direction temporally breaks down, whereby the length L of the transmitted vectors decreases and subsequently more of these are added up again. The number N therefore increases greatly shortly after t=12 s. With an increase of the speed, the number N then decreases again. Therefore a decrease of the speed correlates here to an increase of the number N of the vectors added up in the total vector; in other words a reverse proportionality between the number N and the speed of the gesture represented by the movement data is present here.

Although the present invention has previously been described by means of exemplary embodiments, it is understood that various changes and embodiments can be implemented without leaving the scope of the present invention as it is defined in the enclosed claims.

With regard to further features and advantages of the present invention, reference is explicitly made to the disclosure of the drawings.

The invention claimed is:

1. A method for determination of a speed vector for a gesture recognition system in a motor vehicle, comprising the steps of:
    detecting movement data by a detection unit, wherein the movement data represents a gesture of a user;
    transmitting the movement data to a processing unit in a form of vectors;
    totalling of the vectors to form a total vector by the processing unit, until the total vector reaches a predetermined minimum length or a predetermined number of vectors is totalled; and
    determining the speed vector by averaging the movement data contained in the total vector, if the predetermined minimum length of the total vector is achieved, wherein the speed vector represents a speed and a direction of the gesture of the user.

2. The method according to claim 1, wherein the speed vector is determined to be a zero vector if the predetermined number of vectors is totalled and the predetermined minimum length of the total vector is not achieved.

3. The method according to claim 1, wherein the totalling of the vectors to form a total vector is aborted by the processing unit and the speed vector is determined to be a zero vector if the totalling is carried out within a predetermined time.

4. The method according to claim 1, wherein the speed vector is determined to be a zero vector if two consecutive vectors to be totalled each have a length of zero.

5. The method according to claim 1, wherein the speed vector is determined from the total vector if, for a predetermined time, no vector is transmitted to the processing unit.

6. The method according to claim 1, wherein the speed vector is determined from the total vector, if a length of two consecutive vectors to be totalled differs by more than the predetermined minimum length.

7. The method according to claim 1, wherein the movement data are detected by a touch-sensitive detection unit.

8. The method according to claim 1, wherein the transmitting occurs at discrete, predetermined time intervals.

9. The method according to claim 1, wherein the transmitting occurs at variable time intervals.

10. A device for determination of a speed vector for a gesture recognition system in a motor vehicle, wherein the device comprises equipment which implements the method according to claim 1.

* * * * *